J. W. HOLLAND.
DETACHABLE VEHICLE BODY.
APPLICATION FILED APR. 26, 1916.
1,222,868.
Patented Apr. 17, 1917.
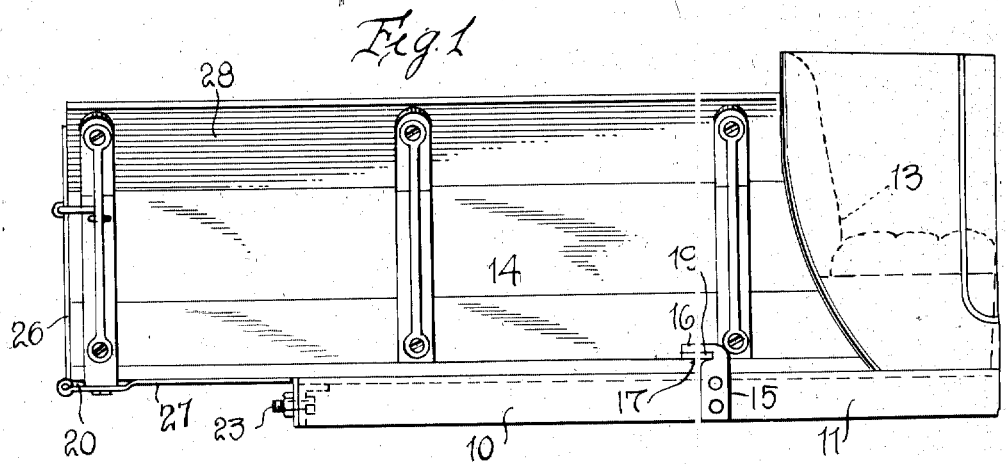
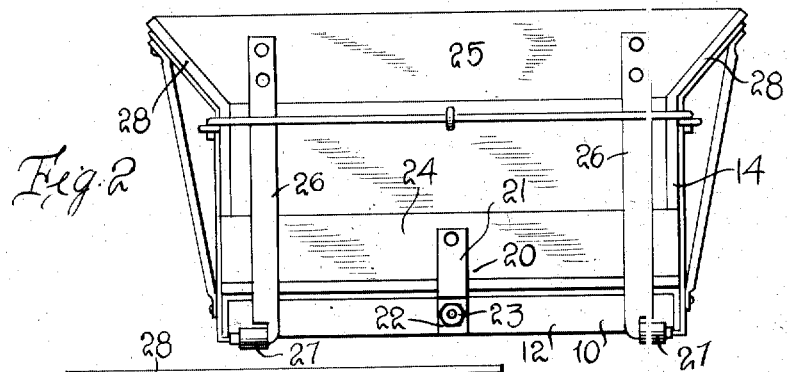
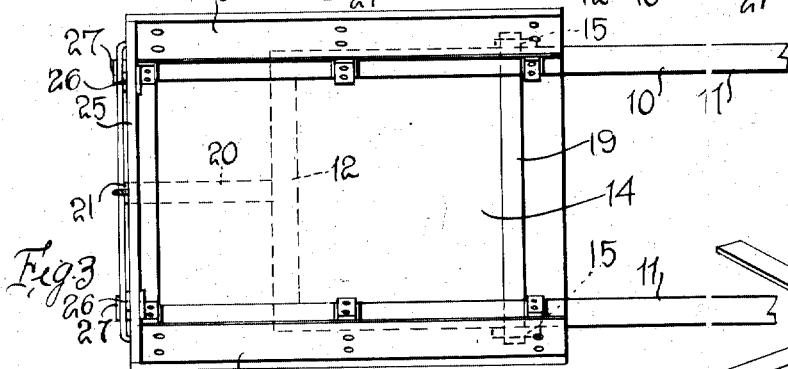
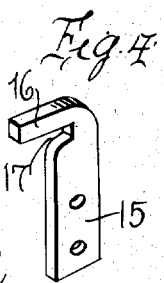
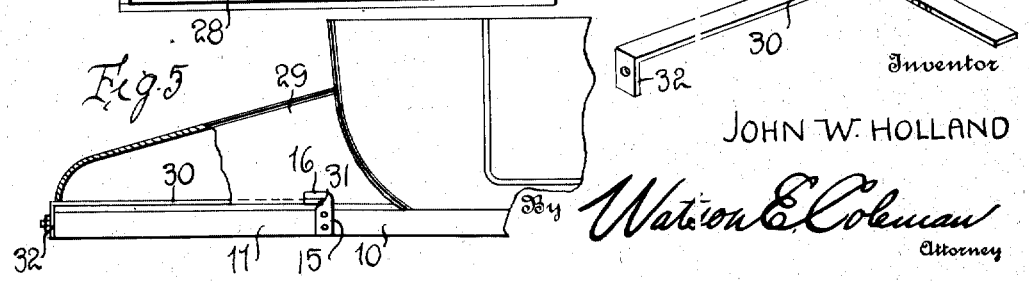
Inventor
JOHN W. HOLLAND
By Watson E. Coleman
Attorney

UNITED STATES PATENT OFFICE.

JOHN W. HOLLAND, OF KELSO, TENNESSEE.

DETACHABLE VEHICLE-BODY.

1,222,868.  Specification of Letters Patent.  Patented Apr. 17, 1917.

Application filed April 26, 1916. Serial No. 93,738.

*To all whom it may concern:*

Be it known that I, JOHN W. HOLLAND, citizen of the United States, residing at Kelso, in the county of Lincoln and State of Tennessee, have invented certain new and useful Improvements in Detachable Vehicle-Bodies, of which the following is a specification, reference being had to the accompanying drawings.

This invention relates to vehicles, and particularly to automobiles, and the general object of the invention is to provide means whereby bodies may be interchanged upon the frame of the automobile or other vehicle and held firmly but detachably in position thereon.

A further object of the invention is to provide a very simple mechanism to this end which may be applied to practically all makes of cars, whereby the car may be converted from a roadster, for instance, into a delivery car, and vice versa.

A further object is to provide devices to this end which may be readily applied to a car of ordinary make or removed therefrom and which will permit the conversion of the car and the interchange of the bodies.

Other objects will appear in the course of the following description.

My invention is illustrated in the accompanying drawings, wherein:

Figure 1 is a side elevation of an automobile frame with one form of body attached thereto;

Fig. 2 is a rear elevation of the body and frame illustrated in Fig. 1;

Fig. 3 is a fragmentary top plan view of the construction shown in Fig. 1;

Fig. 4 is a perspective detail view of one of the angular irons 15;

Fig. 5 is a fragmentary side elevation, partly in section, of the automobile frame with another form of body applied thereto;

Fig. 6 is a perspective view of the iron 30 for use with the last-named body.

Referring to these figures, 10 designates the frame or chassis of the vehicle which may be of any ordinary or usual construction but is illustrated as the frame of a roadster. This frame is provided with the side beams 11 and the rear transversely extending beam 12. In roadsters the forward end of the frame supports the usual seat 13 while the rear end of the frame supports a relatively small body. For the purpose of supporting upon this frame a body 14 which is illustrated as the body of a delivery wagon or car, I mount upon the side bars 11 of the frame the upwardly extending irons 15 which at their upper ends are rearwardly bent as at 16 and longitudinally slotted as at 17 so as to form rearwardly directed hooks and across the bottom of the body 14 I dispose an iron 19 having the form of a bar or strip which projects beyond the side walls of the body 14 and is adapted to engage beneath the bills 16 of the hooks formed on the upper ends of the irons 15, these projecting ends of the strips 19 engaging in the slots 17. The body 14 has of course the same width as the frame 10 but when it is disposed in position rearward of the seat 13 the rear end of the body projects beyond the frame.

For the purpose of supporting the rear end of the body and at the same time detachably connecting the cross bar 12 of the frame, I attach to the rear end of the body the iron 20 which is in the form of a strip, preferably upwardly bent as at 21 at its rear end and downwardly bent as at 22 at its forward end, this forward end 22 being perforated for the passage of a bolt 23. The cross bar 12 is also perforated for the passage of this bolt 23 so that when the body is in place upon the frame and this bolt 23 is passed through the cross bar and the downwardly extending end 22, the body will be locked firmly in place upon the frame and held from any longitudinal, lateral or vertical movement.

As illustrated, the rear end of the body 14 has an upwardly extending wall 24 and the upwardly turned end 21 of the iron 20 is bolted, riveted or otherwise attached to this upwardly extending wall. Above this wall 24 I have illustrated an end gate 25 which is hinged to the wagon body by hinge irons 26, these hinge irons extending downward and engaging with hinge irons 27 attached to the bottom of the body. Suitable means are provided for latching this end gate in its raised position. I have also illustrated the sides of the wagon body as having vertical walls and the outwardly extending racks 28 but it is obvious that the exact form of this body is not essential to my invention and it may be changed in various ways.

For the purpose of detachably connecting to the bed or frame of an automobile of the roadster type the usual small body or box 29 which is ordinarily supplied with cars of the roadster type, I provide the T-shaped iron 30 which is attached to this body 29, this iron 30 having the transversely extending bar 31 projecting beyond the body 20 and engageable beneath the bills 16 of the hooks 15, the rear end of this iron 30 being downwardly bent as at 32 to engage with the cross beam 12 of the wagon bed or frame as illustrated in Fig. 5.

It will thus be seen that by the means heretofore described it is possible to very quickly interchange wagon bodies upon the car bed or frame and that when either of the wagon bodies are in place it will be held firmly in position.

My devices may be applied to practically all makes of car, but are particularly applicable to Ford automobiles of the roadster type. The appliances may be cheaply made, readily attached, and are very effective for the purpose intended.

Having described the invention, what I claim is:

1. Means for detachably connecting a wagon body to a vehicle bed comprising a pair of hooks adapted to be attached to the sides of the bed and having rearwardly projecting bills, and a T-shaped iron adapted to be attached to the bottom of a wagon body, the lateral ends of the T-shaped iron being engageable with said hooks, the rear end of the T-shaped iron being downwardly bent and perforated for engagement with an attaching bolt.

2. The combination with a vehicle frame or bed having upwardly extending laterally disposed hooks formed with rearwardly extending bills, of a wagon body having laterally projecting members engageable beneath the bills of the hooks, and means at the rear end of the wagon body for detachably connecting said rear end to the rear end of the frame and preventing rearward movement of the body relative to the frame.

3. The combination with a vehicle frame having laterally disposed hooks attached thereto and formed with rearwardly extending bills, of a wagon body having a transverse bar the ends of which project beyond the body and are adapted to engage beneath said bills, and a member attached to the rear end of the body extending downward from the bottom thereof and adapted to be disposed against the rear end of the frame, and a fastening device detachably connecting said member to the rear end of the frame.

4. The combination with a vehicle frame or bed having laterally disposed irons formed at their upper ends with rearwardly extending hook-shaped terminals, the bills of said terminals extending rearward, of a body having a transverse bar attached to the bottom thereof, the ends of which are adapted to extend beneath said bills, the rear end of the body having an iron attached thereto formed with a downwardly extending terminal end adapted to abut against the rear end of the bed or frame when the bar is in engagement with said first-named iron, and a bolt passing through the rear end of the frame and engaging said downwardly turned terminal end.

5. The combination with a vehicle frame or bed, and upwardly extending laterally disposed irons on said bed, each of said irons being bent to form a hook having a rearwardly extending bill, of a wagon body removably disposed upon said frame or bed having a transversely extending bar at its forward end projecting beyond the sides of the wagon body and engageable with said hook-shaped irons and beneath the bills thereof, the rear end of the body having an iron applied to the bottom thereof, having a downwardly extending terminal end adapted to abut against the rear end of the frame, and detachably bolted thereto.

In testimony whereof I hereunto affix my signature in the presence of two witnesses.

JOHN W. HOLLAND.

Witnesses:
W. B. SMITH,
J. T. HOLLAND.